US011155068B2

(12) United States Patent
Ilinich et al.

(10) Patent No.: US 11,155,068 B2
(45) Date of Patent: Oct. 26, 2021

(54) METHOD OF MANUFACTURING A LIGHTWEIGHT LAMINATE

(71) Applicant: FORD MOTOR COMPANY, Dearborn, MI (US)

(72) Inventors: Andrey M. Ilinich, Novi, MI (US); Alexander Mamutov, Dearborn, MI (US); S. George Luckey, Jr., Dearborn, MI (US); David John Hill, Ann Arbor, MI (US); Jason Scott Balzer, Commerce Township, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/790,047

(22) Filed: Feb. 13, 2020

(65) Prior Publication Data
US 2020/0180290 A1    Jun. 11, 2020

Related U.S. Application Data

(62) Division of application No. 15/053,280, filed on Feb. 25, 2016, now Pat. No. 10,603,886.

(51) Int. Cl.
*B32B 15/18*    (2006.01)
*B29C 51/08*    (2006.01)
(Continued)

(52) U.S. Cl.
CPC ............ *B32B 37/06* (2013.01); *B29C 51/082* (2013.01); *B29C 51/087* (2013.01); *B29C 51/14* (2013.01); *B29C 66/3432* (2013.01); *B32B 1/00* (2013.01); *B32B 3/26* (2013.01); *B32B 5/18* (2013.01); *B32B 5/32* (2013.01); *B32B 7/04* (2013.01); *B32B 7/12* (2013.01); *B32B 7/14* (2013.01); *B32B 15/00* (2013.01); *B32B 15/046* (2013.01); *B32B 15/08* (2013.01); *B32B 15/082* (2013.01); *B32B 15/085* (2013.01); *B32B 15/088* (2013.01); *B32B 15/09* (2013.01); *B32B 15/092* (2013.01); *B32B 15/095* (2013.01); *B32B 15/098* (2013.01); *B32B 15/18* (2013.01); *B32B 15/20* (2013.01); *B32B 27/06* (2013.01);
(Continued)

(58) Field of Classification Search
None
See application file for complete search history.

(56) References Cited

U.S. PATENT DOCUMENTS 4,078,959 A    3/1978  Palfey et al.
6,171,705 B1 *  1/2001  Clifford ................. B32B 15/04
                                         428/464

(Continued)

OTHER PUBLICATIONS http://www.jtmconsultancy.nl/pdf/hylite_presentation.pdf; "Sandwich Materials" Hylite, Corus, Automotive Applications.

*Primary Examiner* — Barbara J Musser
(74) *Attorney, Agent, or Firm* — Vincent Mastrogiacomo; Brooks Kushman P.C.

(57) ABSTRACT

A method of producing a laminated article comprising placing a first metal skin, a core, and a second metal skin freely onto each other as discreet layers to provide a layered component; and forming the layered component into a shaped article via a die prior to producing a laminated article by applying pressure and heat to the shaped article, wherein at least the first skin moves relative to the core and/or second skin during the forming.

9 Claims, 5 Drawing Sheets

(51) Int. Cl.
| | |
|---|---|
| B32B 38/18 | (2006.01) |
| B32B 38/12 | (2006.01) |
| B32B 27/36 | (2006.01) |
| B32B 15/098 | (2006.01) |
| B32B 27/40 | (2006.01) |
| B32B 15/088 | (2006.01) |
| B32B 27/38 | (2006.01) |
| B32B 15/09 | (2006.01) |
| B32B 27/34 | (2006.01) |
| B32B 15/082 | (2006.01) |
| B32B 7/14 | (2006.01) |
| B32B 27/42 | (2006.01) |
| B32B 15/085 | (2006.01) |
| B32B 27/32 | (2006.01) |
| B32B 3/26 | (2006.01) |
| B29C 51/14 | (2006.01) |
| B29C 65/00 | (2006.01) |
| B32B 37/06 | (2006.01) |
| B32B 15/00 | (2006.01) |
| B32B 7/12 | (2006.01) |
| B32B 15/20 | (2006.01) |
| B32B 5/32 | (2006.01) |
| B32B 27/18 | (2006.01) |
| B32B 15/04 | (2006.01) |
| B32B 27/30 | (2006.01) |
| B32B 15/08 | (2006.01) |
| B32B 15/095 | (2006.01) |
| B32B 5/18 | (2006.01) |
| B32B 27/20 | (2006.01) |
| B32B 27/08 | (2006.01) |
| B32B 1/00 | (2006.01) |
| B32B 7/04 | (2019.01) |
| B32B 27/06 | (2006.01) |
| B32B 27/28 | (2006.01) |
| B32B 15/092 | (2006.01) |
| B32B 37/10 | (2006.01) |
| B32B 37/12 | (2006.01) |
| B32B 38/00 | (2006.01) |
| B32B 37/14 | (2006.01) |
| B32B 37/04 | (2006.01) |
| B29C 44/12 | (2006.01) |
| B29L 9/00 | (2006.01) |

(52) U.S. Cl.
CPC ............ *B32B 27/065* (2013.01); *B32B 27/08* (2013.01); *B32B 27/18* (2013.01); *B32B 27/20* (2013.01); *B32B 27/281* (2013.01); *B32B 27/283* (2013.01); *B32B 27/285* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *B32B 38/12* (2013.01); *B32B 38/1866* (2013.01); B29C 44/1228 (2013.01); B29K 2995/0097 (2013.01); B29L 2009/00 (2013.01); B29L 2009/001 (2013.01); B29L 2009/003 (2013.01); B32B 37/04 (2013.01); B32B 37/10 (2013.01); B32B 37/12 (2013.01); B32B 37/144 (2013.01); B32B 2038/0084 (2013.01); B32B 2250/03 (2013.01); B32B 2250/24 (2013.01); B32B 2250/40 (2013.01); B32B 2262/0269 (2013.01); B32B 2262/04 (2013.01); B32B 2262/062 (2013.01); B32B 2262/065 (2013.01); B32B 2262/10 (2013.01); B32B 2262/101 (2013.01); B32B 2262/103 (2013.01); B32B 2262/106 (2013.01); B32B 2262/14 (2013.01); B32B 2266/025 (2013.01); B32B 2266/0214 (2013.01); B32B 2266/0228 (2013.01); B32B 2266/0235 (2013.01); B32B 2266/0242 (2013.01); B32B 2266/0257 (2013.01); B32B 2266/0264 (2013.01); B32B 2266/0271 (2013.01); B32B 2266/0278 (2013.01); B32B 2266/0285 (2013.01); B32B 2266/045 (2013.01); B32B 2270/00 (2013.01); B32B 2305/022 (2013.01); B32B 2307/102 (2013.01); B32B 2307/304 (2013.01); B32B 2307/308 (2013.01); B32B 2307/3065 (2013.01); B32B 2307/4026 (2013.01); B32B 2307/50 (2013.01); B32B 2307/552 (2013.01); B32B 2307/58 (2013.01); B32B 2307/714 (2013.01); B32B 2307/7145 (2013.01); B32B 2307/7163 (2013.01); B32B 2307/732 (2013.01); B32B 2307/752 (2013.01); B32B 2311/00 (2013.01); B32B 2553/00 (2013.01); B32B 2605/00 (2013.01); B32B 2605/003 (2013.01); B32B 2605/08 (2013.01); B32B 2605/10 (2013.01); B32B 2605/12 (2013.01); B32B 2605/18 (2013.01); B32B 2607/00 (2013.01)

(56) References Cited

U.S. PATENT DOCUMENTS

| | | |
|---|---|---|
| 6,618,944 B1 | 9/2003 | Persson et al. |
| 8,273,208 B2 | 9/2012 | Brinner |
| 2005/0214553 A1 | 9/2005 | Yannetti et al. |
| 2008/0102263 A1 | 5/2008 | Slywchuk et al. |
| 2009/0142538 A1 | 6/2009 | Sigler et al. |
| 2011/0244213 A1 | 10/2011 | Jones |
| 2013/0242487 A1* | 9/2013 | Fujioka ............ B29C 45/14811 361/679.01 |
| 2014/0251531 A1* | 9/2014 | Chergui ............ B32B 38/0012 156/222 |
| 2016/0263818 A1* | 9/2016 | Hammer ................ B32B 5/18 |
| 2017/0165904 A1 | 6/2017 | Comstock, Jr. et al. |
| 2018/0194044 A1* | 7/2018 | de Groot ................ B32B 5/20 |

* cited by examiner

METHOD OF MANUFACTURING A LIGHTWEIGHT LAMINATE

CROSS-REFERENCE TO RELATED APPLICATIONS

This application is a division of U.S. application Ser. No. 15/053,280 filed Feb. 25, 2016, now U.S. Pat. No. 10,603,886, the disclosure of which is hereby incorporated in its entirety by reference herein.

TECHNICAL FIELD

The disclosure relates to a lightweight laminate having a non-metallic core and metallic skins and a method of producing the lightweight laminate.

BACKGROUND

Laminates are composites featuring layers of different materials joined together to provide a laminated material with enhanced strength, durability, or other benefits. A variety of laminates for automotive applications have been developed to assist with increasing demands for improved fuel economy, safety, and other attractive performance characteristics of various vehicles. These laminate materials include, for example, quiet laminates and lightweight laminates having a non-metallic core and metal skins. Manufacturing parts from these laminates, however, remains a challenge. Lightweight laminated parts may be especially difficult to form via typical manufacturing techniques. In common applications such as standard stamping operations, the differing stiffness of the skins and the core results in the core's inability to translate stresses through its thickness in a fashion similar to monolithic sheet metal.

SUMMARY

A method of producing a laminated article is disclosed. The method may include a step of placing a first metal skin, a core, and a second metal skin freely onto each other as discreet layers to provide a layered component. The method may include forming the layered component into a shaped article via a die prior to producing a laminated article by applying pressure and heat to the shaped article. At least the first skin may move relative to the core and/or the second skin during the forming. The method may further include a step of adding an adhesive to the layered component, the shaped article, or the laminated article. The first metal skin and the second metal skin may have a same chemical composition. The chemical composition of the first metal skin may be different than a chemical composition of the second metal skin. The method may include a step of establishing a connection between the first metal skin, the core, and the second metal skin of the layered component and prior to the forming, removing the connection. The core may comprise at least one blowing agent. The heat may be applied only to a periphery of the shaped article. The layered component may comprise blocked co-polymers to be activated after the laminated article is produced. The core may be about 15 µm to 4 mm thick. The thickness of the first metal skin may differ from a thickness of the second metal skin.

In another embodiment, a method of producing a laminated article is disclosed. The method may include a step of placing a first metal skin connected to a core and a second metal skin freely onto each other to provide two discreet layers. The method may further include forming the two discreet layers into a shaped article via a die prior to producing a laminated article by applying pressure and heat to the shaped article. At least one of the discreet layers may move relative to the other during the forming. The chemical composition of the first metal skin may be different than a chemical composition of the second metal skin. The first metal skin and the second metal skin may have a same chemical composition. The method may further include establishing a connection between the two discreet layers and prior to the forming, removing the connection. The core may comprise at least one blowing agent.

In yet another embodiment, a method of producing a laminated article is disclosed. The method may include arranging the first and second discreet layers to be freely in contact with each other within a die, wherein the first discreet layer comprises a laminated first skin and a first core and the second discreet layer comprises a laminated second skin and a second core. The method may include forming via the die a shaped article from the layers such that the layers move relative to each other during the forming. The method includes laminating the shaped article. The first skin, the second skin, or both may be metallic. The chemical composition of the first discreet layer may be different than a chemical composition of the second discreet layer. The first core and the second core may have different chemical compositions. The thickness of the first discreet layer may differ from the thickness of the second discreet layer.

DETAILED DESCRIPTION

Figure 1A:
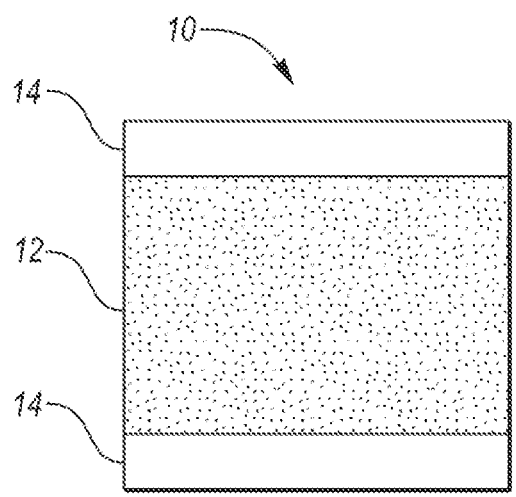
FIG. 1A depicts a schematic side view of a lightweight laminate in accordance with one embodiment.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 1B:
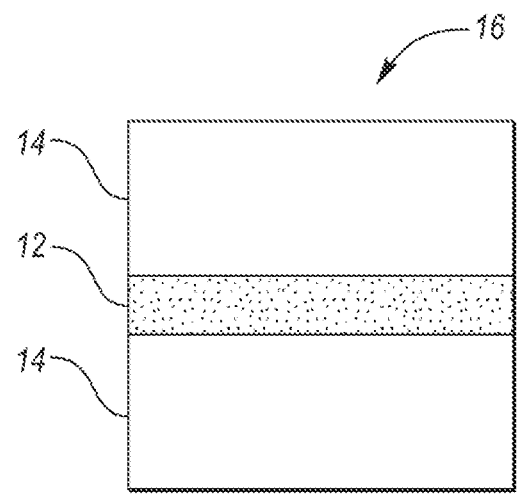
FIG. 1B depicts a schematic side view of a quiet laminate.

A need for continuous improvement in fuel economy and safety has led to the development of a variety of specialized materials with attractive performance properties and enhanced strength to weight ratios. Such specialized materials include quiet and lightweight laminates having metal outer skins and a non-metallic core. For example, a laminate with a thin core and thick steel outer layers, also referred to as Quiet Steel™, is widely used in body-in-white applications for its sound dampening properties. Unlike Quiet Steel™, lightweight laminates have a thick core, comprising more than 40% of the laminate thickness. Although the lightweight laminates have some sound dampening properties, the main advantage is their reduced areal density, which allows significant weight saving and thus contributes to improved fuel efficiency. The comparison between the two types of laminate is shown in FIGS. 1A and 1B. The lightweight laminate 10 in FIG. 1A includes a relatively thick core 12 sandwiched between two outer skin layers 14 which are typically thinner than the core 12. As can be seen in FIG. 1B, the quiet laminate 16 includes a relatively thin core 12 sandwiched in between two relatively thick outer skin layers 14.

Figure 2A:
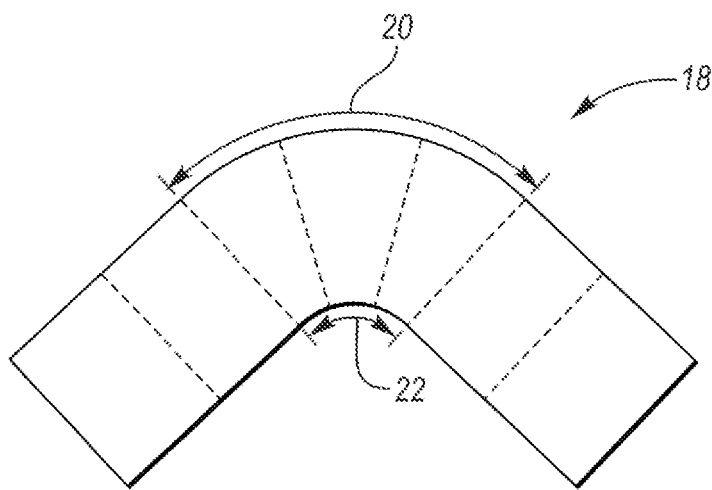
FIG. 2A depicts a schematic side view of a monolithic sheet metal manufactured according to prior art during a bending event.
Figure 2B:
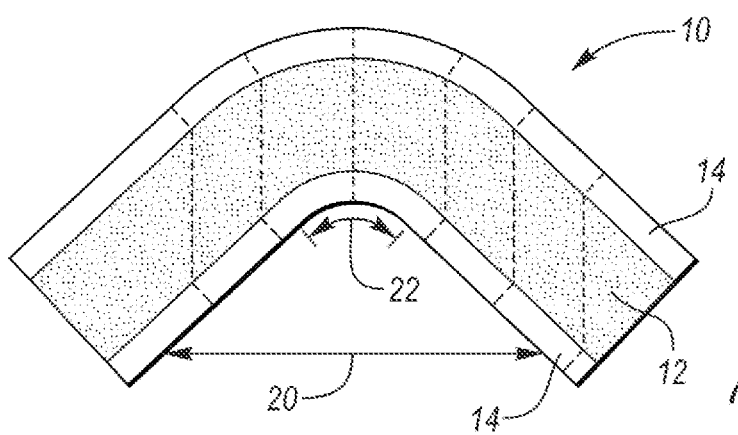
FIG. 2B illustrates a schematic side view of a lightweight laminate manufactured according to a prior art method during a bending event.

Unfortunately, the lightweight laminate 10 is difficult to form via standard stamping operations. The problem stems from the significantly lower stiffness of the non-metallic core 12 compared to the outer metal skins 14. This disparity in stiffness results in the core's inability to translate the stresses through its thickness in a fashion similar to monolithic metal sheets 18. The difference in material stiffness is especially evident during bending of the laminate 10, where the metal skin 14 on the outside of the bend stretches significantly less compared to the monolithic metal sheet 18, and the metal skin 14 on the inside of the bend compresses significantly less compared to the monolithic metal sheet 18. Thus, the skins 14 shift and/or buckle to accommodate the length of line change. This loading causes severe shear deformation in the core 12, as shown schematically in FIG. 2B. FIGS. 2A and 2B illustrate differences in bending behavior of a monolithic metal sheet 18 and a lightweight laminate 10. The dashed lines in FIGS. 2A and 2B schematically show that the normal sections stay approximately normal to the bend center line.

Figure 3A:
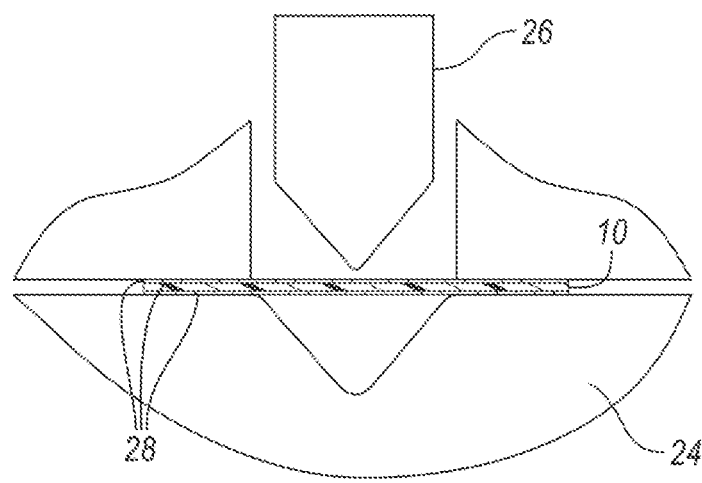
FIGS. 3A and 3B show schematically a series of manufacturing steps for production of a lightweight laminate according to a prior art method.

As can be seen in FIG. 2A, a deformation zone in the blank 20 of a monolithic metal sheet 18 is localized within the bending radius 22. In contrast, as is illustrated in FIG. 2B, the deformation zone of blank 20 of a lightweight laminate 10, manufactured by a conventional stamping operation, reaches beyond the bending radius 22. As can be seen in FIG. 3A illustrating a conventional stamping operation, a lightweight laminate 10 is placed in the die 24. A punch 26 then comes into contact with the laminate 10. All layers 28 of the laminate are forced to adopt to the shape of the die 24. No sliding between the laminate layers 28 is possible as the layers 28 are bonded to one another. Therefore, high shear stress is developed in the core 12. This ultimately translates into the laminate's relatively poor surface quality and a relatively large spring back.

Figure 3B:
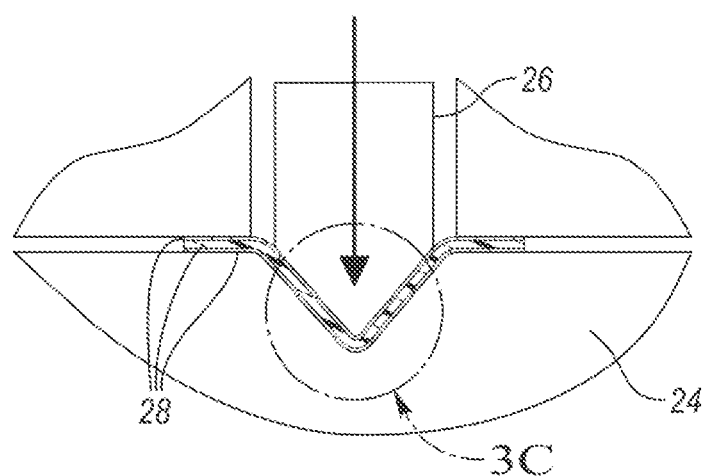
Figure 3C:
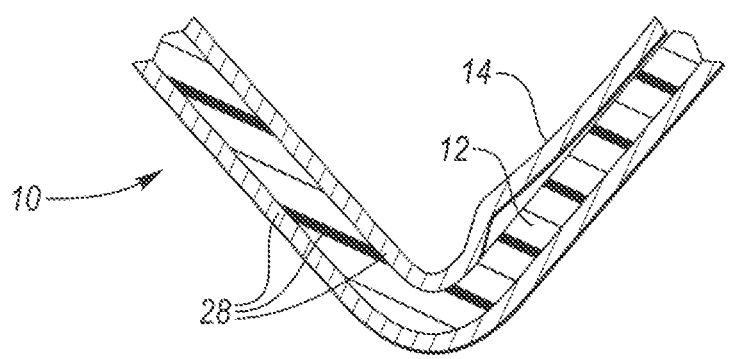
FIG. 3C shows a schematic cross section of a delaminated lightweight laminate manufactured according to a prior art method.

Additionally, the shear stress in the core 12 often exceeds its limits, causing core 12 failure or delamination of at least one skin 14 inside of the bend, as is illustrated in FIG. 3B. This failure mode leads to excessive wrinkle formation, is relatively hard to predict, and may be relatively hard to detect in an article formed from such a laminate. As a result, most lightweight laminates 10 produced by conventional metal stamping have relatively poor surface quality with excessive buckling and spring back. Furthermore, material formability may present a problem due to restrictions of the material flow by wrinkles and buckling. Thus, it would be desirable to manufacture lightweight laminate 10 in such a way as to prevent creation of shear stresses which cause buckling of the laminate and product delamination. Additionally, it would be desirable to develop a method of lightweight laminate manufacturing which could be used to produce the quiet laminate as well.

Figure 4A:
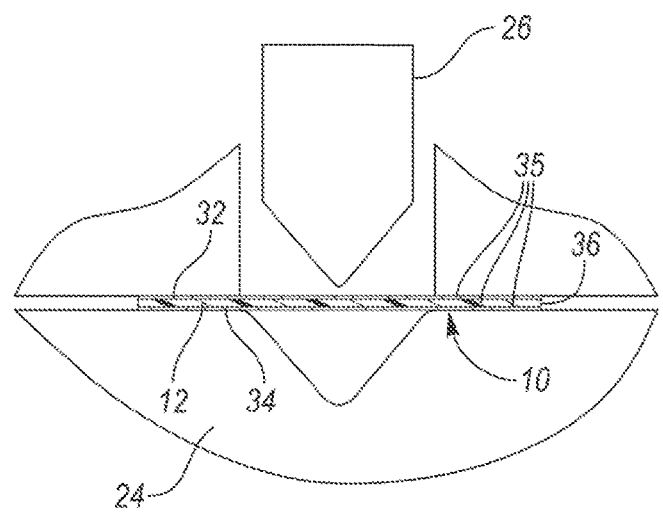
FIGS. 4A-4C show schematically a series of manufacturing steps for production of a lightweight laminate according to one or more embodiments.
Figure 4B:
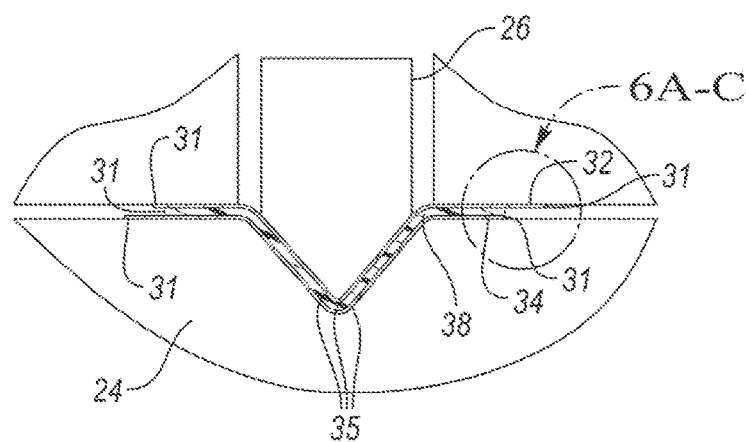
Figure 4C:
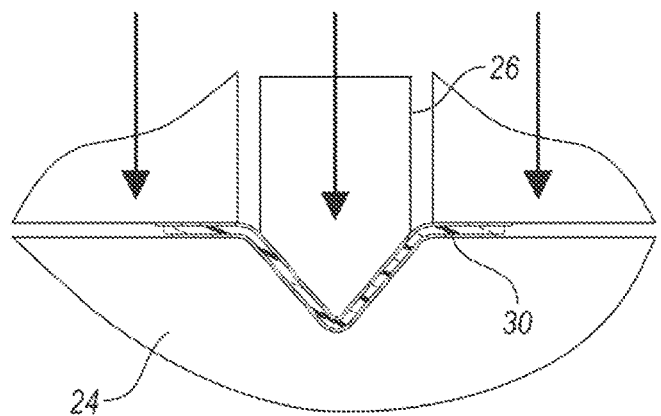

According to one or more embodiments, depicted in FIGS. 4A-4C, a method is provided for producing a laminated article 30 from a lightweight laminate 10 in such a way that the laminate's core and skin layers 12, 32, and 34 are capable of sliding against each other in the die 24 during a stamping operation. The stamping operation may be performed in any apparatus capable of pressing two or more layers together, forming a laminate, or joining the layers together to form a laminate. Non-limiting examples of such apparatuses are a conventional match tool two sided stamping die, a one sided die in a bladder press, an apparatus for hydroforming process, or the like.

As can be seen in FIG. 4A, the method includes placing a first metal skin 32, a core 12, and a second metal skin 34 freely onto each other as discreet layers 35 to provide a layered component 36. The method further includes forming the layered component 36 having the discreet layers 35 into a shaped article 38 via a die 24. The method includes forming the layered component 36 prior to producing a laminated article 30 by applying pressure p and heat T to the shaped article 38. Once the heat and pressure are applied to the shaped article 38, the core and skin layers 12, 32, and 34 are joined together, are not discreet anymore, and cannot freely move relative to each other. Because the core and skin layers 12, 32, and 34 can freely move relative to each other during the stamping operation, the edges 31 of the core and skin layers 12 and 14 may not be aligned upon completion of the stamping operation. One or more trimming operations may be implemented during one or more downstream operations to trim off the unaligned excess material from the edges 31.

At least two of the core and skin layers 12, 32, and 34 form discreet layers 35 which are free to slide against each other during the stamping operation to avoid creation of sheer stresses in the core 12. As the stamping punch 26 comes in contact with the discreet layers 35, the layers 35 are allowed to adjust their position relative to each other as they are being formed into a shaped article 38. The discreetness of the layers 35 thus prevents or reduces shear deformation of the core 12 and avoids one or more drawbacks associated with the conventional lightweight laminate 10 production described above.

The first and second metal skins 32 and 34 may be formed from metal or metal alloys with the base element including but not limited to aluminum, iron, titanium, or another metal such as copper or molybdenum. The alloying elements may include, but are not limited to, carbon, copper, silicon, zinc, manganese, magnesium, iron, chromium, scandium, rhodium, nickel, cobalt, lithium, potassium, gold, silver, tin, zirconium, the like, or a combination thereof. Other metal materials are contemplated. It is also contemplated that the outer skins 14 could be non-metallic as long as the skins 14 have higher stiffness than the core 12. The outer skins 14 thus may me formed, for example, from a variety of polymeric materials.

The material of the outer skins 14 can be supplied in any form, for example in sheets, strips, rolls, cut pieces, the like, or a combination thereof. The core 12 material may be supplied in rolls, as a film, as a sheet or the like. The outer skins 14 may be supplied from two different coils while the core 12 may be supplied from a third coil. Alternatively, a coil supplying the first metal skin 32 may also provide the second metal skin 34 if both skins are to be from the same material. The core 12 and the skins 14 may be placed together to form the layered component 36 in the die 24. Alternatively, the core 12 and the skins 14 may be co-rolled onto a common coil prior to placement of the layers 28 into the die so that the common coil with the layered component 36 may be prepared beforehand. This arrangement may be advantageous for preventing contamination of the inner contact surfaces of the outer skin 14 to the core 12 as well as handling and transportation purposes.

The core 12 may be non-metallic. The core 12 may include a certain portion of metallic material such as thin metal fibers or the like. The core 12 may be reinforced with metal. The core 12 may be formed from a variety of materials including, but not limited to, reinforced or unreinforced polymers, thermoplastics, unactivated thermosets, a combination thereof, or the like. The material may be homogenous or non-homogenous such as a mixed material or a composite material having a thermoplastic or thermoset matrix. The thermoplastics may include acrylics such as polymethylmethacrylate; acrylonitrile butadiene styrene; nylon; biodegradable thermoplastics derived from renewable resources such as polylactic acid; polycarbonate; polybenzimidazole; thermoplastics having high thermal, oxidative, and hydrolytic stability such as polyether sulfone; polyetherimide; polyolefins such as polyethylene, polypropylene; polystyrene; polyvinyl chloride, polyphenylene oxide; polyphenylene sulfide; polyetherether ketone; the like, or a combination thereof. Any other thermoplastic material that becomes pliable or moldable above a specific temperature and solidifies upon cooling is contemplated.

The thermosets may include polyester resin, vinylester epoxy resin, phenolic resin, polyurethane, polyimide, silicone, or another type of resin, and combinations thereof. Any other plastic that cures irreversibly when induced by heat, irradiation, or through a chemical reaction is contemplated. Because thermosets cannot be reheated and melted to attain a different shape once they are hardened, a thermoset used as a material within the core 12 has to be unreacted during the stamping operation. This ensures that the thermoset remains malleable within the discreet layers 35 of the layered component 36 and the shaped article 38.

The core 12 may be reinforced with fibers such as carbon fibers to increase stiffness, provide weight reduction, and improve fatigue resistance, and chemical resistance. For example, carbon fibers are suitable due to their high strength-to-weight and stiffness-to-weight ratio. However, any type of fiber is contemplated. Other suitable fiber may include aramid fiber, glass, basalt, the like, or a combination thereof. The core 12 may be reinforced with lignocellulosic fibers such as cotton, wool, flax, jute, coconut, hemp, straw, grass fiber, and other fibers available directly from natural sources, as well as chemically modified natural fibers, for example chemically modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. These lists of natural fibers are illustrative and not limiting. Examples of chemically modified fibers also include azlon (regenerated natural proteins), regenerated cellulose products including cellulose xanthate (rayon), cellulose acetate, cellulose triacetate, cellulose nitrate, alginate fibers, casein-based fibers, and the like.

Figure 5:
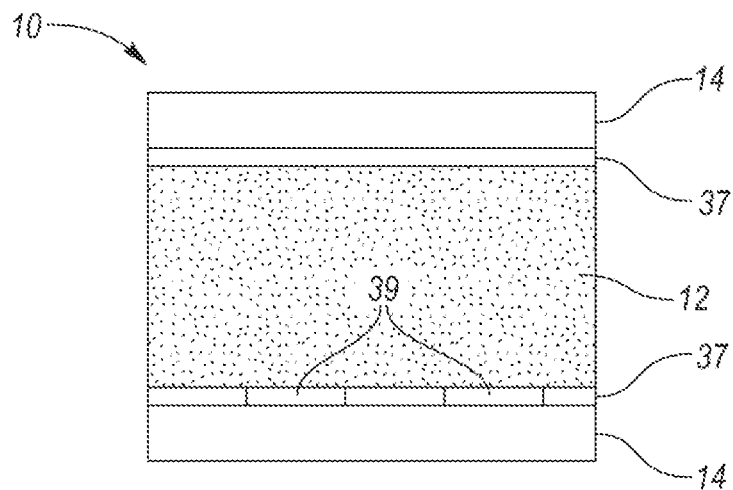
FIG. 5 shows a schematic side view of a lightweight laminate including a plurality of adhesive layers according to one or more embodiments.

The material of the core 12 may function as an adhesive above a certain temperature such as melting temperature Tm and/or pressure needed to activate tackiness of the material. Pressure may be needed to provide wet-out and hold the layers 14 together. In addition, the layered component 36 may include at least one more adhesive. At least one adhesive may be included in the core 12, in the layered component 36, in the shaped article 38, in the laminated article 30, or a combination thereof. As is illustrated in FIG. 5, at least one adhesive may be present as one or more separate adhesive layers 37 between the layers 14 and the core 12 to facilitate bonding of the discreet layers 35. The adhesive layers 37 may be continuous or feature gaps 39 which are adhesive-free. Alternatively, the core 12 may comprise only an adhesive, be free of an adhesive and/or the method may be free of using any adhesive.

Any type of adhesive may be used including solvent-based adhesives, solventless adhesives, water-based adhesives. Any solvent present should be evaporated prior to laminating. The tackiness of the adhesive may be activated by heat and/or pressure. Non-limiting examples of pressure-sensitive adhesives include an elastomer compound with a suitable tackifier such as a rosin ester. The elastomer may include acrylics, butyl rubber, ethylene-vinyl acetate, natural rubber, nitriles, silicone rubbers, styrene block copolymers, vinyl ethers, the like, or a combination thereof. Other adhesives may include base materials such as ethylene-vinyl acetates, polyolefins such as polyethylene, atactic polypropylene, polybutene-1, polybutene-1, amorphous polyolefins, polyamides, polyesters, polyurethanes, styrene block copolymers, polycaprolactones, polycarbonates, fluoropolymers, silicone rubbers, polypyrroles. Exemplary additives used in such adhesives may include tackifying resins such as rosins and their derivates; terpenes and modified terpenes; aliphatic, cycloaliphatic, and aromatic resins, the like or a combination thereof. The adhesive may also include plasticizers such as benzoates including 1,4-cyclohexane dimethanol dibenzoate, glyceryl tribenzoate, or pentaerythritol tetrabenzoate, phthalates, paraffin oils, polyisobutylene, chlorinated paraffins, the like, or a combination thereof.

The core 12 and/or the skins 14 may include one or more blowing agents capable of producing a cellular structure via foaming process in the core material 12 undergoing hardening. The addition of a blowing agent into the lightweight laminate 10 may reduce overall density of the laminate 10, increase relative stiffness, increase thermal and acoustic insulation, the like, or a combination thereof. The blowing agent may be also incorporated to accommodate one or more gaps which may form between the core and skin layers 12 and 14 across the length of the shaped article 38. The blowing agents may be physical blowing agents such as chlorofluorocarbons, hydrochlorofluorocarbons, hydrocarbons such as pentane, isopentane, cyclopentane, liquid $CO_2$; chemical blowing agents such as isocyanate and water, hydrazine, other nitrogen-based materials, or sodium bicarbonate; or a combination of the physical and chemical blowing agents. Powdered titanium hydride or zirconium(II) hydride may be used as blowing agents in the metal skins. Other blowing agents are contemplated.

The core 12 may include a variety of other components such as blocking agents preventing activation of the core 12 material, blowing agents, and/or adhesives; fillers for reducing cost, adding bulk, and improving cohesive strength; additives serving a variety of functions such as the additives named above, additives to modify appearance, texture, additives capable of adding pigmentation and adjusting pigment stability, control foaming, modifying rheology, act as catalysts, stabilizers, emulsifiers, texturizers, adhesion promoters, UV stabilizers, antioxidants, corrosion inhibitors, flame retardants, antistatic agents, biocides, fungicides, insecticides, algaecides, the like, or a combination thereof. Any suitable composition capable of delivering any of these functions is contemplated. At least some of these components may be added to enhance final performance of the laminate while at least some of these components may be added to aid in manufacturing. For example, additives imparting color may be useful as a visual aid for processing.

Figure 6A:
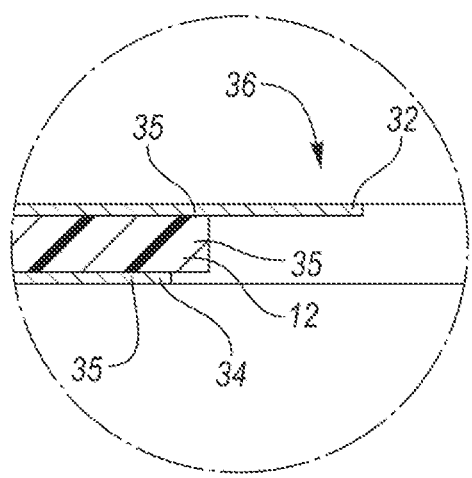
FIGS. 6A-6C show a schematic detailed cross-sectional view of a lightweight laminate illustrated in FIGS. 4A-4C.
Figure 6B:
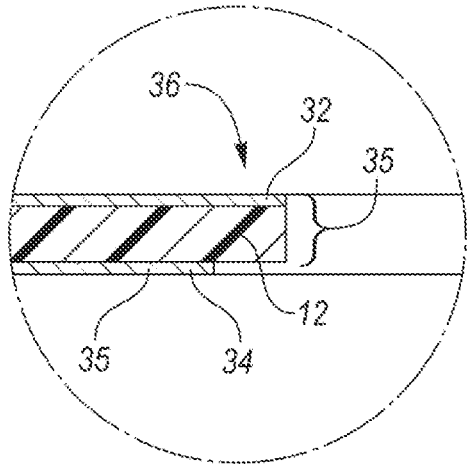
Figure 6C:
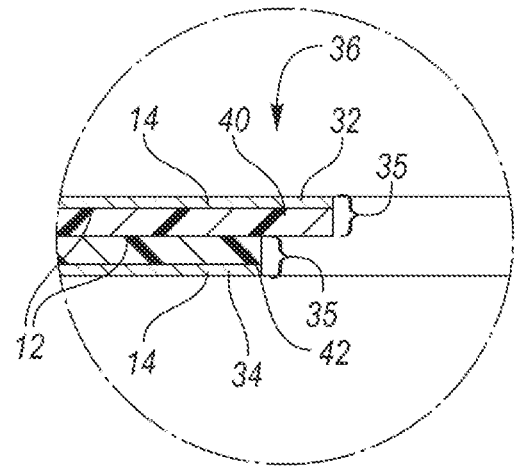

The first metal skin 32 and the second metal skin 34 may have the same or different chemical composition, thickness, and physical properties. The method thus provides for joining of the same or various metals together which are otherwise difficult to join such as different aluminum alloys or different steel grades. Likewise, joining of different core 12 materials to form a laminated article 30 is possible. As can be seen in FIGS. 6A-6C, a variety of options enabling precise tailoring of materials of the laminated material exists. In at least one embodiment illustrated in FIG. 6A, the core 12, the first metal skin 32, and the second metal skin 34 are discreet layers 35 which are movable relative to each other during the stamping process. In contrast, as FIG. 6B shows, the first metal skin 32 and the core 12 may be connected together to form one discreet layer 35 which can move freely relative to the second metal skin 34 during the stamping process. Alternatively, the second metal skin 34 may be joined with the core 12 to form a discreet layer 35 which will move freely relative to the first metal skin 32. In one or more embodiments illustrated in FIG. 6C, the first metal skin 32 is joined with a first core portion 40 to form one discreet layer 35 while the second metal skin 34 is joined with a second core portion 42 to form another discreet layer 35. During the stamping process, the two discreet layers 35, each including a metal skin 14 and a core 12 are free to move relative to each other. The first core portion 40 and the second core portion 42 may have the same or different chemical composition, thickness, and physical properties. Where the discreet layer 35 includes more than one layer such that the discreet layer 35 includes at least a portion of the core 12 and a skin 14, these core and skin layers 12 and 14 may be joined using an adhesive, mechanical devices, lamination, the like, temporarily, or permanently.

The number of discreet layers 35 of the layered component 36 may vary. For example, the layered component 36 may include two discreet layers. The first discreet layer 35 may include a skin 14 and the second discreet layer 35 may include a skin 14 connected to a core 12. Alternatively, the first and second discreet layers 35 both may include a skin 14 and a portion of a core 12. The layered component 36 may include three or more discreet layers 35. The first being a skin 14, the second being a core 12, and the third being a skin 14. Alternatively however, the layered component 36 may include additional layers due to an addition of at least one layer of adhesive, blowing agent, an additive, or the like. Alternatively still, the layered component 36 may include a plurality of core 12 layers such as two, three, four, five, or more layers of the core 12 material.

Figure 7A:
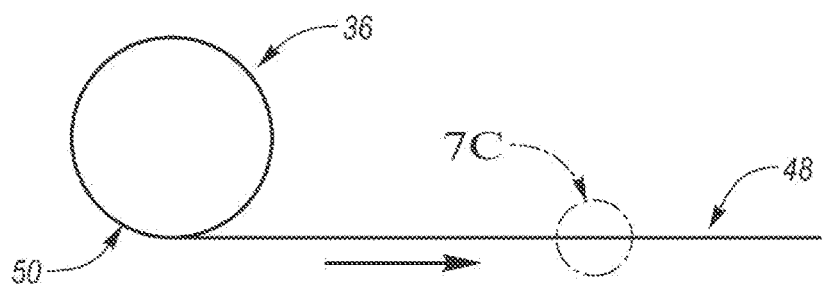
FIG. 7A illustrates a schematic side view of a coil of a layered component.
Figure 7B:
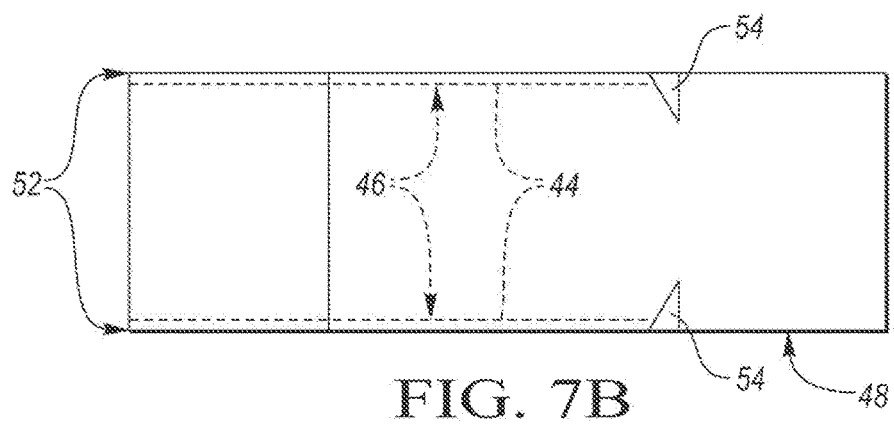
FIG. 7B shows a schematic top view of the layered component depicted in FIG. 7A.
Figure 7C:
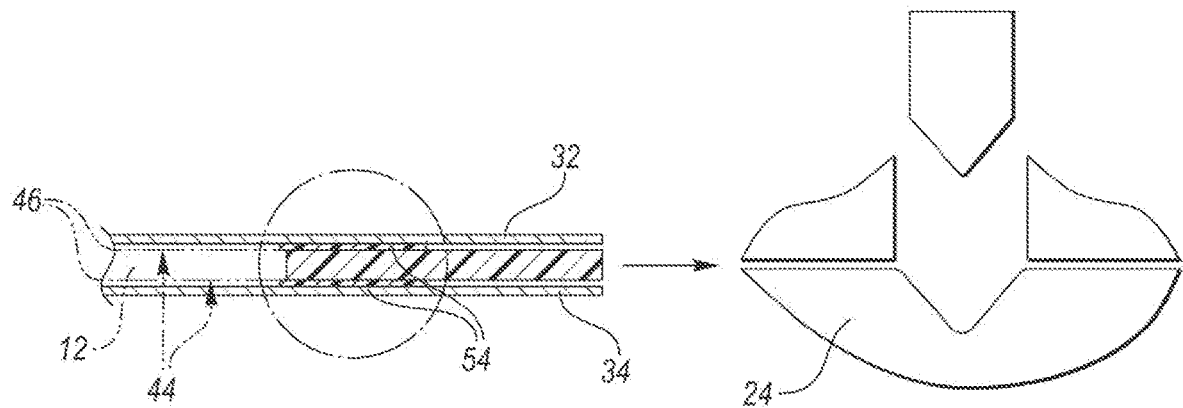
FIG. 7C shows a schematic detailed view of the layered component depicted in FIGS. 7A and 7B.

In at least one embodiment, the method may include a step of establishing a connection 44 between at least some of the discreet layers 35 of the layered component 36. As is illustrated in FIGS. 7A-7C, the method may include a step of establishing a connection 44 between the first metal skin 32, the core 12, and the second metal skin 34 of the layered component 36. The method includes a step of removing the connection 44 before the layered component 36 is formed into a shaped article 38. The connection 44 may be provided as beads 46, a film, a plurality of hooks, staples, or other mechanical devices, the like, or a combination thereof. The connection 44 may be formed by sewing or stitching with a yarn which may shear during forming or which may be removed prior to forming. Another alternative connection 44 may be formed as a connection strip between a spliced coil.

The beads 46 may include an adhesive or another tacky component. While any type of temporary connection 44 may be used, it should be designed not to negatively affect the stamping performance. As can be seen in FIG. 7A, the layered component 36 is being supplied as a sheet 48 from a coil 50. The beads 46 may be applied close to the periphery 52 of the individual core and skin layers 12, 32, and 34 to keep the layers together before the layered component 36 reaches the die 24. This may be beneficial to prevent lateral shifting of the discreet layers 35 and/or contamination of the inner contact surfaces of the core and skin layers 12, 32, and 34. Additionally, the connection 44 may aid with handling and transportation of the layered component 36. The connection 44 should be weak enough to fail during forming of the shaped article 38. Alternatively, the connection 44 may be removed prior to the stamping operation. The removing operation may be performed by cutting, trimming, mechanically, chemically, the like, or in any other suitable manner which results in the layered component 36 having at least two discreet layers 35. In at least one embodiment, depicted in FIGS. 7B and 7C, the beads 46 are removed using one or more blades 54. The connection 44 may be removed prior to placement of the layered component 36 into a die 24 or prior to forming the layered component 36 into the shaped article 38 during the stamping operation.

The method may include a step of applying heat and or pressure to the shaped article 38 so that the shaped article 38 retains the desirable shape of the die 24. Unlike the layered component 36, the shaped article 38 does not have discreet layers 35 which can freely move and adjust their positions relative to each other. The heat, pressure, or both may activate one or more materials within the shaped article 38 which results in joining of the core 12 and skin layers 12, 14 and production of the laminated article 30, as was previously illustrated in FIG. 4.

The heat and/or pressure may be applied immediately after the stamping operation or at a later time. The temperature applied to the shaped article 38 varies and depends on the material composition of the skin layers 12 and 14. The chemical composition of the core 12 may determine what temperature has to be achieved to activate components which are to bond the layers together to form a laminated article 30. For example, the shaped article 38 including an adhesive has to be heated at least to a temperature at which the adhesive becomes tacky to allow tack to develop and thus enable a good bond between discreet layers 35. This tack temperature differs based on the material used. For thermoplastic materials, the applied temperature should be above the specific melting point Tm. Tm for exemplary materials may be from about 115° C. for low density polyethylene or lower to about 265° C. for polycarbonate and polyester or higher. Each material has its optimal range of temperatures for activation which is known in the art and should be complied with to achieve proper joining of layers. Because even small changes in temperature may have a significant effect on physical properties such as impact strength of the material, it is desirable not to apply temperature which would overheat the materials used.

The method may include keeping the shaped article 38 exposed to the desirable elevated temperature and under pressure for an extended period of time after the material has been activated so that cross-linking may occur between discreet layers 35. The extended period of time may be determined experimentally and will depend at least on the dimensions of the shaped article 38, materials used, and the applied temperature and/or pressure. The extended period of time may be from several seconds to several hours. The method may include a cooling step following activation of the material. During the cooling step, the shaped article 38 may be cooled below the activation temperature. The shaped article 38 may be clamped so that a desirable amount of pressure may be applied to the core and skin layers 12 and 14. The amount of pressure to be applied depends on a plurality of factors such as the materials used, the dimensions and shape of the shaped article 38, and length of compression, or the like. Exemplary pressure which may be applied to the shaped article 38 may be about 0.1 MPa to about 100 MPa. Lower and higher pressure is contemplated.

In at least one embodiment, either pressure or heat is not applied to the shaped article 38.

In one or more embodiments, the heat and/or pressure may be applied only to a portion of the shaped article 38, for example at a plurality of spots around a periphery 52 of the shaped article 38. Alternatively, the heat and/or pressure may be applied along the entire periphery 52. Alternatively still, the heat and/or pressure may be applied at a number of locations of the surface of the shaped article 38. The application may be spot curing, utilizing induction coils, or another technology capable of delivering desirable heat and/or pressure to only a portion of the shaped article 38. Because the shaped article 38 does not have to be fully activated in the die 24, the die 24 may be utilized for stamping operations more frequently.

In at least one embodiment, the layered component 36 may include blocked copolymers which are activated only after the laminated article is produced. Blocked copolymers are chemical components not activated by the temperature and/or pressure applied during the stamping operation and during the formation of the laminated article 30. The blocked copolymers may be incorporated in the core 12 or in at least one adhesive layer 37. The adhesive layer 37 may be applied to at least one skin 14, for example as a film. The blocked copolymers are activated by heat at a later date. The heat has to be sufficient to initiate cross-linking reaction between the core 12 material and/or the adhesive so that the skins 14 and the core 12 are properly bonded together.

A shaped article 38 thus may be only partially laminated and the final heat and/or pressure resulting in complete lamination may be performed at a later time, for example during baking process in the paint shop so that the heat applied during painting/drying operations is also utilized to finish formation of the laminated article 30. In such case, it may be desirable to include blocking agents into at least one of the materials of the shaped article 38 so that the core 12 is prevented from being fully activated before the shaped article 38 is further processed.

The method may also include a step of filling one or more gaps in between the layers of the layered component 36, the shaped article 38, and/or the laminated article 30. Any suitable foaming or non-foaming material may be used. The filling material may be applied by spraying or by any other suitable method which is capable of delivering a desirable amount of material into one or more gaps. In at least one embodiment, any existing gaps between the layers of the shaped article 38 may be filled before and/or after application of heat and/or pressure to the shaped article 38.

The method includes a step of producing a laminated article 30 having the following dimensions. The outer skins 14 may each have a thickness of about 0.1 mm to about 4 mm, about 0.25 mm to about 3 mm, about 1 mm to about 2 mm. The core may have a thickness of about 0.05 mm to about 4 mm, about 0.15 mm to about 1 mm, about 0.1 to about 0.8 mm. An exemplary thickness of each layer of a lightweight laminate may be as follows: the first metal skin 32 and the second metal skin 34 each having thickness of about 0.2 to 0.25 mm, and the core 12 having thickness of about 0.3 to about 0.8 mm. An exemplary thickness of each layer of a quiet laminate may be about 0.5 mm for each skin 14 and less than about 0.1 mm for the core 12. The thickness of the first metal skin 32 may differ from a thickness of the second metal skin 34. The method may be utilized to form a laminated article 30 from a lightweight laminate 10 or a quiet laminate 16. The core 12 thickness may thus represent less than about 0.5%, 5%, 10%, 20%, 30%, 40%, 50%, 60%, 70%, 80%, 90% or more of the thickness of the entire laminate. Generally, the core 12 represents more than 40% of the thickness of the entire laminate in the lightweight laminate 10 and less than 40% of the thickness of the entire laminate in the quiet laminate.

The core 12 may be divided into a plurality of portions. In one or more embodiments, the core 12 may be divided in the first core portion 40 and the second core 42 portion, so that each portion creates about 50% of the core 12 thickness. In one or more embodiments, the first core portion 40 may form less than about 0.5%, 5%, 10%, 20%, 30%, 40% or more of the core 12 thickness and the second core portion 42 may form the remainder of the core 12 thickness. A third, fourth, fifth, or an additional core portion is also contemplated.

The laminated article 30 may be an article to be utilized for non-structural interior applications in a vehicle. Non-limiting examples may include underbody noise damping applications, dashboard, package trays, floor pans, underbody noise damping applications, lightweight panels, rain covers, or the like. Non-limiting exemplary types of vehicles which may utilize the laminated article 30 produced by the disclosed methods include land vehicles such as automobiles, buses, vehicles for transportation of goods, motorcycles, off-road vehicles, tracked vehicles, trains, amphibious vehicles, aircrafts, space crafts, watercrafts, or the like. Non-automotive applications are also contemplated.

The method disclosed herein presents several not yet described advantages over the prior art. For example, during the traditional stamping process, orientation of the rolled material may be important from the formability standpoint. The best quality of a conventionally formed stamped product may be achieved when the skins 14 have different orientation with respect to their rolling directions. Yet, in traditional processing methods, the orientation of individual layers typically cannot be tailored. According to the disclosed method, the free movement of the discreet layers 35 relative to each other allows for accommodation of their orientation before the shaped article 53 is formed. Furthermore, if the material for the skins 14 is to be the same, just a single coil can be used to produce the first metal skin 32 as well as the second metal skin 34.

The method also allows to produce laminated articles 30 featuring more intricate shapes than conventional laminates. The laminated articles 30 produced according to the disclosed method have greater detail in contours and sharper features because the discreet layers may adopt the shape of the die more precisely than conventional laminates. This method also presents better material formability and thus easier manufacturing and increased manufacturing efficiency when compared to conventional stamping operations.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of producing a laminated article comprising:
   placing a first metal skin, a core, and a second metal skin freely onto each other as discreet layers to provide a layered component;
   establishing a connection between the first metal skin, the core, and the second metal skin of the layered component, and prior to the forming, removing the connection; and
   forming the layered component into a shaped article via a die prior to producing a laminated article by applying pressure and heat to the shaped article,
   wherein at least the first skin moves relative to the core and/or second skin during the forming.

2. The method of claim 1, further comprising adding an adhesive to the layered component, the shaped article, or the laminated article.

3. The method of claim 1, wherein the first metal skin and the second metal skin have a same chemical composition.

4. The method of claim 1, wherein a chemical composition of the first metal skin is different than a chemical composition of the second metal skin.

5. The method of claim 1, wherein the core comprises at least one blowing agent.

6. The method of claim 1, wherein the heat is applied only to a periphery of the shaped article.

7. The method of claim 1, wherein the layered component comprises blocked co-polymers to be activated after the laminated article is formed.

8. The method of claim 1, wherein the core is about 15 μm to 4 mm thick.

9. The method of claim 1, wherein a thickness of the first metal skin differs from a thickness of the second metal skin.

* * * * *